United States Patent
Sano et al.

(10) Patent No.: US 9,508,379 B2
(45) Date of Patent: Nov. 29, 2016

(54) RECORDING APPARATUS

(71) Applicant: Panasonic Intellectual Property Management Co., Ltd., Osaka (JP)

(72) Inventors: Kousei Sano, Osaka (JP); Yoshiaki Komma, Osaka (JP); Fumitomo Yamasaki, Nara (JP); Kanji Wakabayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/049,424

(22) Filed: Feb. 22, 2016

(65) Prior Publication Data

US 2016/0284375 A1    Sep. 29, 2016

(30) Foreign Application Priority Data

Mar. 23, 2015 (JP) ................. 2015-059018

(51) Int. Cl.
| | | |
|---|---|---|
| G11B 7/135 | (2012.01) | |
| G11B 7/1374 | (2012.01) | |
| G11B 7/09 | (2006.01) | |
| G11B 7/13 | (2012.01) | |
| G11B 7/1353 | (2012.01) | |
| G11B 7/1395 | (2012.01) | |

(52) U.S. Cl.
CPC .......... *G11B 7/1374* (2013.01); *G11B 7/0901* (2013.01); *G11B 7/13* (2013.01); *G11B 7/1353* (2013.01); *G11B 7/1395* (2013.01)

(58) Field of Classification Search
None
See application file for complete search history.

(56) References Cited

U.S. PATENT DOCUMENTS

| | | | | |
|---|---|---|---|---|
| 5,168,490 A | * | 12/1992 | Braat | G11B 7/0903 369/109.02 |
| 6,122,241 A | * | 9/2000 | Akiyama | G11B 7/131 369/112.12 |
| 6,275,463 B1 | * | 8/2001 | Nagata | G11B 7/0903 369/118 |
| 6,314,068 B1 | * | 11/2001 | Sano | G11B 7/0943 369/112.1 |
| 2006/0077810 A1 | | 4/2006 | Yamasaki et al. | |
| 2007/0291596 A1 | * | 12/2007 | Fujiune | G11B 7/094 369/30.03 |
| 2009/0238051 A1 | * | 9/2009 | Nishiwaki | G11B 7/0901 369/47.14 |

FOREIGN PATENT DOCUMENTS

JP    2006-099934    4/2006

* cited by examiner

*Primary Examiner* — Peter Vincent Agustin
(74) *Attorney, Agent, or Firm* — Wenderoth, Lind & Ponack, L.L.P.

(57) ABSTRACT

A recording device of the present disclosure includes a light source, an objective lens, a beam splitter, an optical element, a detector and an operation circuit. The optical element divides a light beam into a first main region, a second main region, a first main end region, a second main end region, a first sub-region, and a second sub-region. The operation circuit generates a main signal in which a first main end region signal is multiplied by a coefficient a and added to the first main region signal, and a second main signal in which a second main end region signal is multiplied by the coefficient α and added to the second main region signal.

8 Claims, 18 Drawing Sheets

RECORDING APPARATUS

BACKGROUND OF THE INVENTION

1. Field of the Invention

The present disclosure relates to a recording apparatus which records information in a recording medium by using light, or which reproduces the information recorded in the recording medium by using light.

2. Description of the Related Art

PTL 1 discloses an optical disc apparatus and an optical head capable of detecting a tilt of an optical disc. The optical head includes a light source, an objective lens, and photo detecting means, and the photo detecting means is divided into at least four regions to obtain a signal from each of the regions. Thus, even if the optical disc and the objective lens tilt, and a lens shift is present, it is possible to obtain an tilt amount as a signal in a small error.

CITATION LIST

Patent Literature

PTL 1: Unexamined Japanese Patent Publication No. 2006-99934

SUMMARY OF THE INVENTION

The present disclosure provides a recording apparatus that a zero cross point of a tracking error signal is less likely to shift from the center of a track, and an amount of off-track of a focus spot suppresses small, even if coma aberration between the recording medium and the objective lens is present.

In addition, the recording apparatus of the present disclosure includes a light source configured to emit a light beam, an objective lens configured to focus the light beam on a recording medium having a groove-shaped track capable of recording information, a beam splitter configured to split the light beam reflected and diffracted by the recording medium from a light path of the light source, an optical element configured to divide the light beam split by the beam splitter into desired regions, a detector configured to receive a light of each region of the desired regions divided by the optical element, and a first operation circuit configured to calculate a signal received from the detector and output the signal. The optical element divides the light beam split by the beam splitter, into a first main region mainly including a region in which a zero-order light and a plus first-order diffracted light of the track overlap with each other, a second main region mainly including a region in which the zero-order light and a minus first-order diffracted light of the track overlap with each other, a first main end region mainly including both ends in a track tangential direction of the region in which the zero-order light and the plus first-order diffracted light of the track overlap with each other, a second main end region mainly including both ends in the track tangential direction of the region in which the zero-order light and the minus first-order diffracted light of the track overlap with each other, a first sub-region located at both ends outside of the first main end region in the track tangential direction from, and a second sub-region located at both ends outside of the second main end region in the track tangential direction. The first operation circuit generates a first main signal in which a signal from the first main end region is multiplied by a coefficient α that is greater than 1 and added to a signal from the first main region, and a second main signal in which a signal from the second main end region is multiplied by the coefficient α and added to a signal from the second main region.

The recording apparatus of the present disclosure is possible to stably record the information or reproduce the information by performing tracking control in which an amount of off-track is small even if coma aberration between the recording medium and the objective lens is present.

DETAILED DESCRIPTION OF THE PREFERRED EMBODIMENTS

Exemplary embodiments will be described in detail below with appropriate reference to the drawings. However, an unnecessarily detailed description may be omitted. For example, a detailed description of an already well known matter and a duplicate description for substantially the same configuration may be omitted. This is to avoid the description below is unnecessarily redundant, and to facilitate understanding of those skilled in the art.

Incidentally, accompanying drawings and the description below are provided so that those skilled in the art sufficiently understand the present disclosure, and are not intended to limit the claimed subject matter.

FIRST EXEMPLARY EMBODIMENT

A first exemplary embodiment will be described below with reference to FIGS. 1 to 9.

[1-1. Configuration of Optical Pickup]

Figure 1:
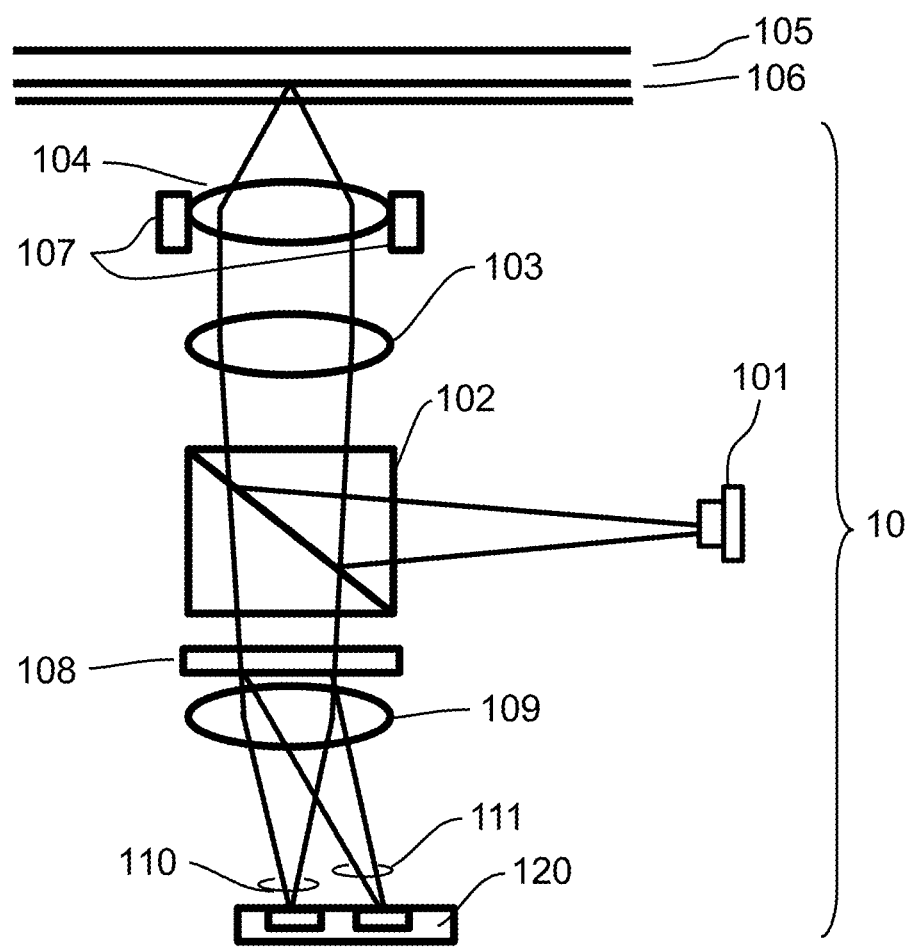
FIG. 1 is a configuration diagram of an optical pickup of an optical disc drive in a first exemplary embodiment.

FIG. 1 is a configuration diagram of an optical pickup in the first exemplary embodiment. In FIG. 1, optical pickup 10 includes semiconductor laser 101, beam splitter 102, collimator lens 103, objective lens 104, actuator 107, diffraction element 108, detection lens 109, and detector 120.

A light beam emitted from semiconductor laser 101 that is a light source of optical pickup 10 is reflected by beam splitter 102, is made to be parallel light by collimator lens 103, is converged by objective lens 104, and is collected to a focus spot.

To place the focus spot at a position on recording layer 106 of optical disc 105, objective lens 104 is controlled and moved by actuator 107.

The light beam is reflected and diffracted by recording layer 106, and is again made to be parallel light by objective lens 104, and then is made to be converged light by collimator lens 103, transmits through beam splitter 102, and enters diffraction element 108 that is a kind of an optical element.

Diffraction element 108 divides the light beam that enters, into a plurality of regions, and diffracts a part of the light beam in a predetermined direction. Zero-order light component 110 of the light beam passing through diffraction element 108 and diffracted first-order light component 111 by diffraction element 108, pass through detection lens 109 and enter detector 120.

[1-2. Relationship Between Mark and Track of Optical Disc]

Figure 2A:
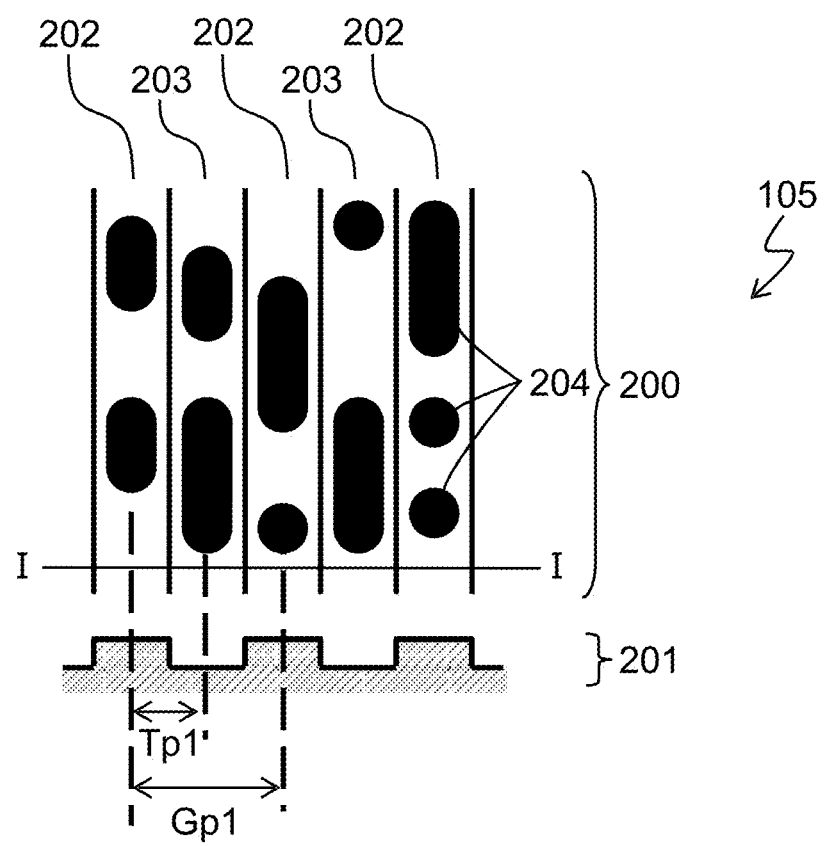
FIG. 2A is a schematic diagram illustrating a relationship between a recording mark and a track of an optical disc in the first exemplary embodiment.

FIG. 2A is a schematic diagram illustrating a relationship between an information recording mark and a track of an optical disc in the first exemplary embodiment. FIG. 2A is a schematic diagram illustrating an example of recording information on both of a land and a groove. FIG. 2A illustrates front 200 of optical disc 105 that is an enlarged part of optical disc 105 and I-I cross section 201 of optical disc 105. A surface of a recording layer of optical disc 105 is configured by groove 202 and land 203, and recording mark 204 is recorded on both of groove 202 and land 203. To groove pitch Gp1 that is a distance from the center of groove 202 to the center of adjacent groove 202, track pitch Tp1 that is an interval at which the information is recorded is half of the distance, and it is possible to record information in the high density, in comparison with a case of recording information at groove pitch Gp1.

Figure 2B:
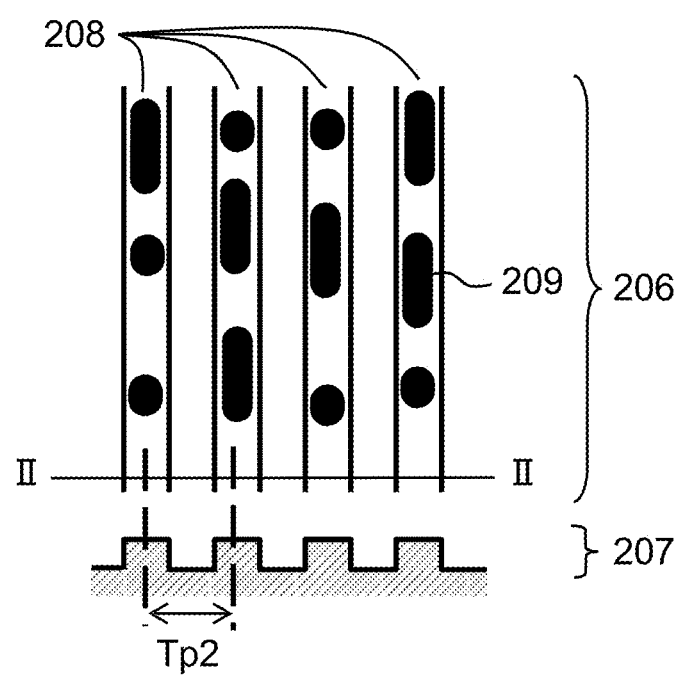
FIG. 2B is a schematic diagram illustrating a relationship between a recording mark and a track of a conventional optical disc.

FIG. 2B is a schematic diagram illustrating a relationship between an information recording mark and a track of a conventional optical disc. FIG. 2B is a schematic diagram illustrating an example of recording information on a groove. FIG. 2B illustrates front 206 of the conventional optical disc that is an enlarged part of the conventional optical disc and II-II cross section 207. A surface of a recording layer of the conventional optical disc is configured by groove 208, and recording mark 209 is recorded on groove 208. A groove pitch that is a distance from the center of groove 208 to the center of adjacent groove 208 is track pitch Tp2 that is an interval at which information is recorded.

In optical disc 105 of the present exemplary embodiment, in comparison with the conventional optical disc, track pitch Tp1 is smaller than track pitch Tp2; however, groove pitch Gp1 is greater than track pitch Tp2.

[1-3. Configuration of Diffraction Element]

Figure 3:
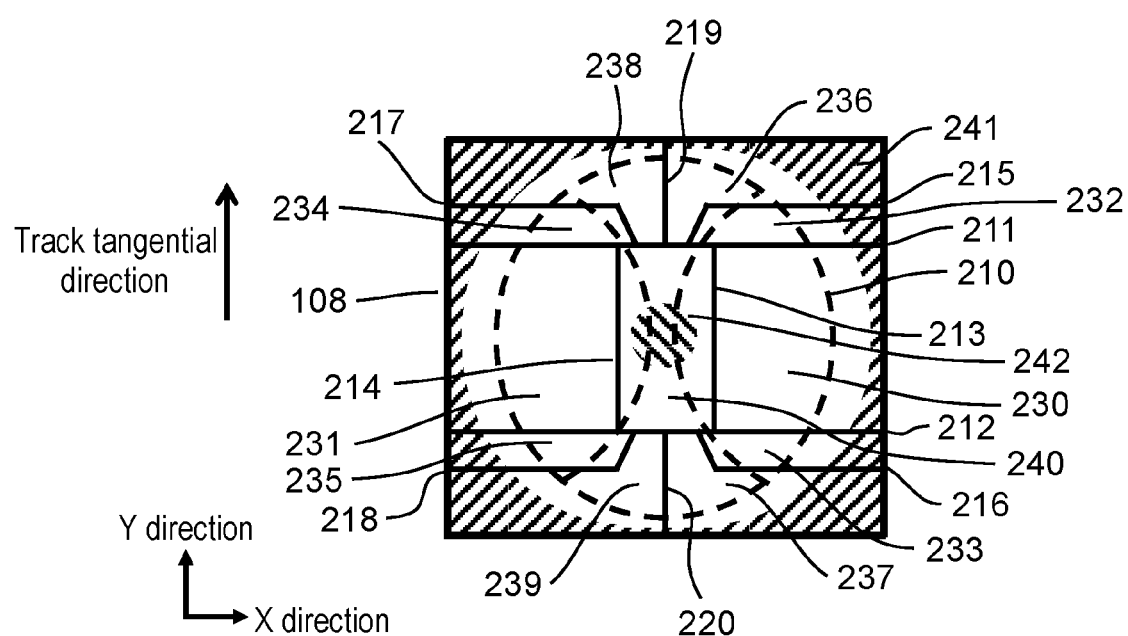
FIG. 3 is a front view of a diffraction element in the first exemplary embodiment.

FIG. 3 is a front view of diffraction element 108 in the first exemplary embodiment. Light beam 210 that enters diffraction element 108 is illustrated by a dashed line. In FIG. 3, a radial direction that is a vertical direction to a track tangential direction is an X direction, and a tangential direction that is a parallel direction to the track tangential direction is a Y direction. A boundary of a region in which a zero-order light and a plus first-order diffracted light diffracted by the track overlap with each other, of light beam 210 and a boundary of a region in which the zero-order light and a minus first-order diffracted light overlap with each other, of light beam 210 are also illustrated by the dashed line. Opening light-shielding part 241 and central light-shielding part 242 illustrated by an oblique line do not allow a light beam that enters the parts to transmit by reflecting or absorbing the light beam. A region into which the light beam enters of diffraction element 108, that is, a region inside the dashed line of light beam 210 in FIG. 3 is divided by division lines 211, 212, 213, 214, 215, 216, 217, 218, 219, 220 into eleven regions 230, 231, 232, 233, 234, 235, 236, 237, 238, 239, 240.

Region 230 is a region surrounded by division lines 211, 212, 213, and is a first main region mainly including a region in which the zero-order light and the plus first-order diffracted light diffracted by the track overlap with each other. Here, region 230 "mainly including" the region in which the zero-order light and the plus first-order diffracted light overlap with each other, is intended to refer that the ratio of the region in which the zero-order light and the plus first-order diffracted light overlap with each other to region 230 is equal to or greater than 50%, desirably is substantially 100%. It is the same in the following.

Region 231 is a region surrounded by division lines 211, 212, 214, and is a second main region mainly including the region in which the zero-order light and the minus first-order diffracted light diffracted by the track overlap with each other. That is, the ratio of the region in which the zero-order light and the minus first-order diffracted light overlap with each other to region 231 is equal to or greater than 50%, desirably is substantially 100%.

Region 232 is a region surrounded by division lines 211, 215, and is a part of a first main end region mainly including an end in the track tangential direction of the region in which the zero-order light and the plus first-order diffracted light diffracted by the track overlap with each other. That is, the ratio of the end in the track tangential direction of the region in which the zero-order light and the plus first-order diffracted light overlap with each other to region 232 is equal to or greater than 50%, desirably is substantially 100%.

Region 233 is a region surrounded by division lines 212, 216, and is the rest part of the first main end region mainly including the end in the track tangential direction of the region in which the zero-order light and the plus first-order diffracted light diffracted by the track overlap with each other. That is, the ratio of the end in the track tangential direction of the region in which the zero-order light and the plus first-order diffracted light overlap with each other to region 233 is equal to or greater than 50%, desirably is substantially 100%.

Region 234 is a region surrounded by division lines 211, 217, and is a part of a second main end region mainly including an end in the track tangential direction of the region in which the zero-order light and the minus first-order diffracted light diffracted by the track overlap with each other. That is, the ratio of the end in the track tangential direction of the region in which the zero-order light and the minus first-order diffracted light overlap with each other to region 234 is equal to or greater than 50%, desirably is substantially 100%.

Region 235 is a region surrounded by division lines 212, 218, and is the rest part of the second main end region mainly including the end in the track tangential direction of the region in which the zero-order light and the minus first-order diffracted light diffracted by the track overlap with each other. That is, the ratio of the end in the track tangential direction of the region in which the zero-order light and the minus first-order diffracted light overlap with each other to region 235 is equal to or greater than 50%, desirably is substantially 100%.

Region 236 is a region surrounded by division lines 211, 215, 219, and is a part of a first sub-region located at an end outside of region 232 that is the first main end region.

Region 237 is a region surrounded by division lines 212, 216, 220, and is the rest part of the first sub-region located at an end outside of region 233 that is the first main end region.

Region 238 is a region surrounded by division lines 211, 217, 219, and is a part of a second sub-region located at an end outside of region 234 that is the second main end region.

Region 239 is a region surrounded by division lines 212, 218, 220, and is the rest part of the second sub-region located at an end outside of region 235 that is the second main end region.

Region 240 is a region surrounded by division lines 211, 212, 213, 214, and is a dummy region.

[1-4. Configuration of Optical Disc Drive]

Next, a configuration of an optical disc drive in the first exemplary embodiment will be described. First, a configuration of a first operation circuit and detector 120 of optical pickup 10 will be described.

Figure 4A:
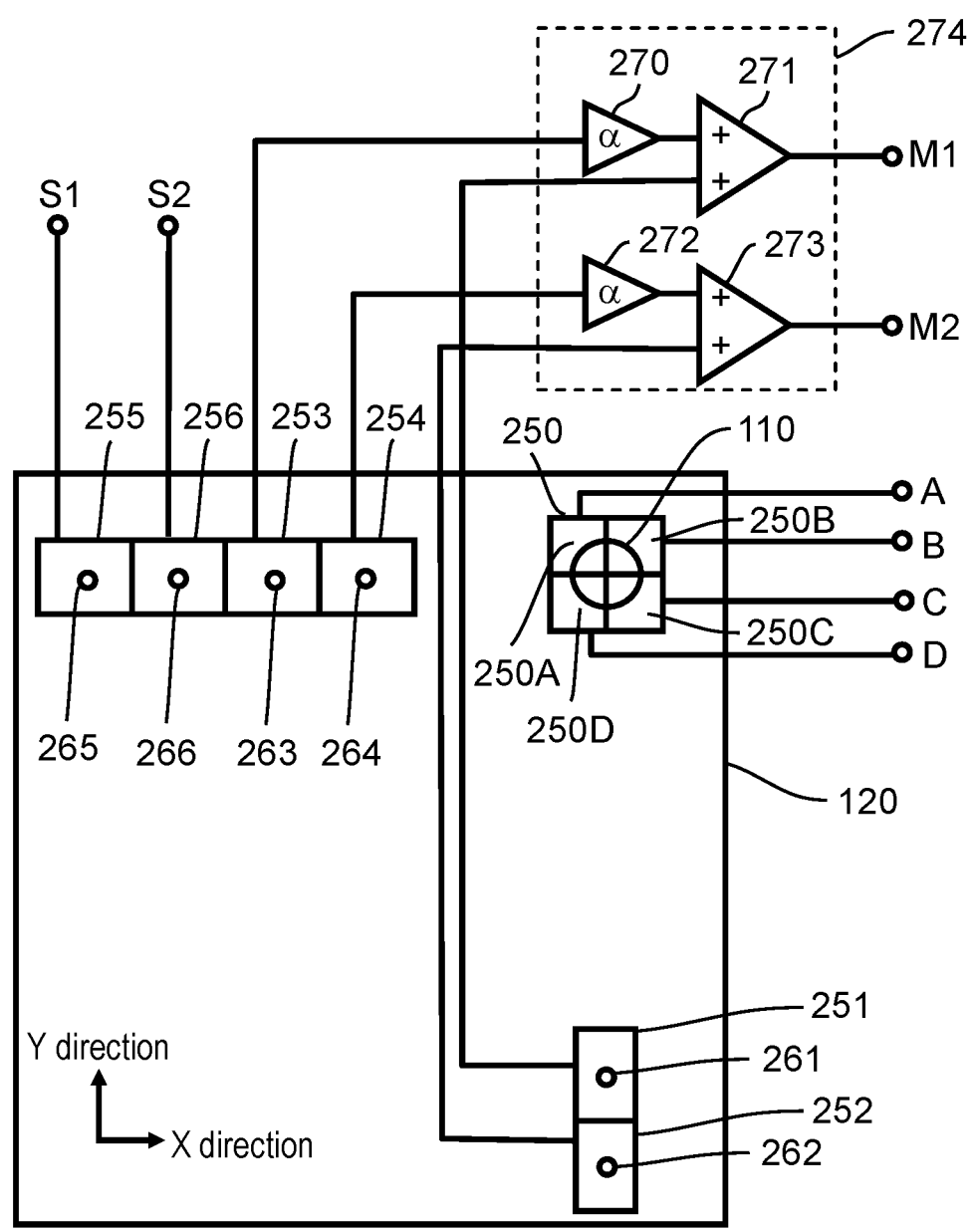
FIG. 4A is a configuration diagram of a detector and a first operation circuit in the first exemplary embodiment.

FIG. 4A is a configuration diagram of the first operation circuit and detector 120 in the first exemplary embodiment.

Photo detector 250 includes four photo detecting regions that are photo detecting regions 250A, 250B, 250C, 250D.

Photo detector 251 receives light beam 261 diffracted by region 230 that is the first main region.

Photo detector 252 receives light beam 262 diffracted by region 231 that is the second main region.

Photo detector 253 receives light beam 263 diffracted by region 233 and region 234 that are the first main end regions.

Photo detector 254 receives light beam 264 diffracted by region 235 and region 236 that are the second main end regions.

Photo detector 255 receives light beam 265 diffracted by region 237 and region 238 that are the first sub-regions.

Photo detector 256 receives light beam 266 diffracted by region 238 and region 239 that are the second sub-regions.

The light beam received by photo detector 250 is converted to an electric signal depending on an amount of light. The electric signal converted depending on the amount of light by photo detecting region 250A is output from output terminal A. The electric signal converted depending on the amount of light by photo detecting region 250B is output from output terminal B. The electric signal converted depending on the amount of light by photo detecting region 250C is output from output terminal C. The electric signal converted depending on the amount of light by photo detecting region 250D is output from output terminal D. The signals output from output terminals A, B, C, D are used for generating a focus signal and reproducing information read from a recording medium.

The light beam received by each of the photo detectors 251, 252, 253 and 254 is converted to an electric signal depending on an amount of light, and is input to first operation circuit (calculator) 274.

The light beam received by photo detector 255 is converted to an electric signal depending on an amount of light, and is output from terminal S1.

The light beam received by photo detector 256 is converted to an electric signal depending on an amount of light, and is output from terminal S2.

The first operation circuit 274 includes amplifiers 270, 272 and adders 271, 273. Amplifier 270 receives the signal from photo detector 253, and outputs a signal in which the input signal is multiplied by $\alpha$, where $\alpha$ is a coefficient greater than 1. Adder 271 adds the signal from photo detector 251 to the signal from amplifier 270, and outputs a summed signal as a first main signal to terminal M1. Amplifier 272 receives the signal from photo detector 254, and outputs a signal in which the input signal is multiplied by $\alpha$. Adder 273 adds the signal from photo detector 252 to the signal from amplifier 272, and outputs a summed signal as a second main signal to terminal M2.

Figure 4B:
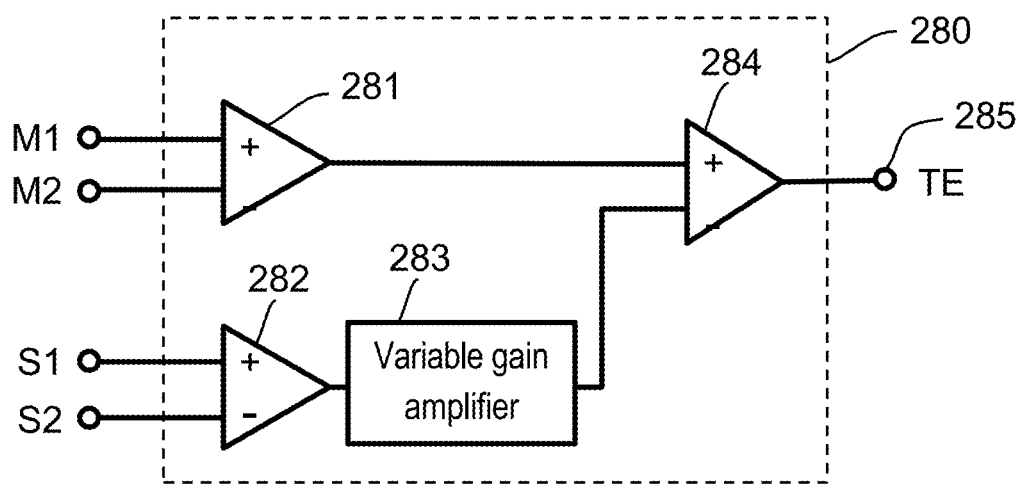
FIG. 4B is a configuration diagram of a second operation circuit in the first exemplary embodiment.

FIG. 4B is a configuration diagram of a second operation circuit in the first exemplary embodiment. Second operation circuit 280 is an operation circuit configured to generate a tracking error signal. Second operation circuit 280 includes differential circuits 281, 282, 284, and variable gain amplifier 283. Second operation circuit 280 receives the signal from terminal M1 that is the first main signal, the signal from terminal M2 that is the second main signal, the signal from terminal S1, and the signal from terminal S2 to calculate these signals, and outputs a signal after calculating.

Differential circuit 281 receives the signal from terminal M1 and the signal from terminal M2 to output their difference signal as a main difference signal.

Differential circuit 282 receives the signal from terminal S1 and the signal from terminal S2 to output their difference signal as a sub-difference signal.

Variable gain amplifier 283 receives the sub-difference signal output from differential circuit 282 to output a signal in which the input signal is multiplied by k, where k is a variable gain. A value of variable gain k is in a range of 1.5 to 12.

Differential circuit 284 receives the main difference signal output from differential circuit 281 and the sub-difference signal that is multiplied by k output from variable gain amplifier 283 to output their difference signal as the tracking error signal from terminal 285. The tracking error signal is used as a control signal for driving actuator 107. By the tracking error signal, even if eccentricity is present in the optical disc, a position of the focus spot is controlled so that the focused light beam follows the track.

Here, a signal obtained from region 230 that is the first main region is defined as MA1, and a signal obtained from region 231 that is the second main region is defined as MA2. A signal obtained from region 232 and region 233 that are the first main end regions is defined as MB1, and a signal obtained from region 234 and region 235 that are the second main end regions is defined as MB2. A signal obtained from region 236 and region 237 that are the first sub-regions is defined as S1, and a signal obtained from region 238 and region 239 that are the second sub-regions is defined as S2. Signals M1, M2 are expressed as:

$$M1 = MA1 + \alpha \cdot MB1;$$

$$M2 = MB1 + \alpha \cdot MB2;$$

The tracking error signal is defined as TE, TE is expressed as:

$$TE = M1 - M2 - k \cdot (S1 - S2).$$

Figure 5:
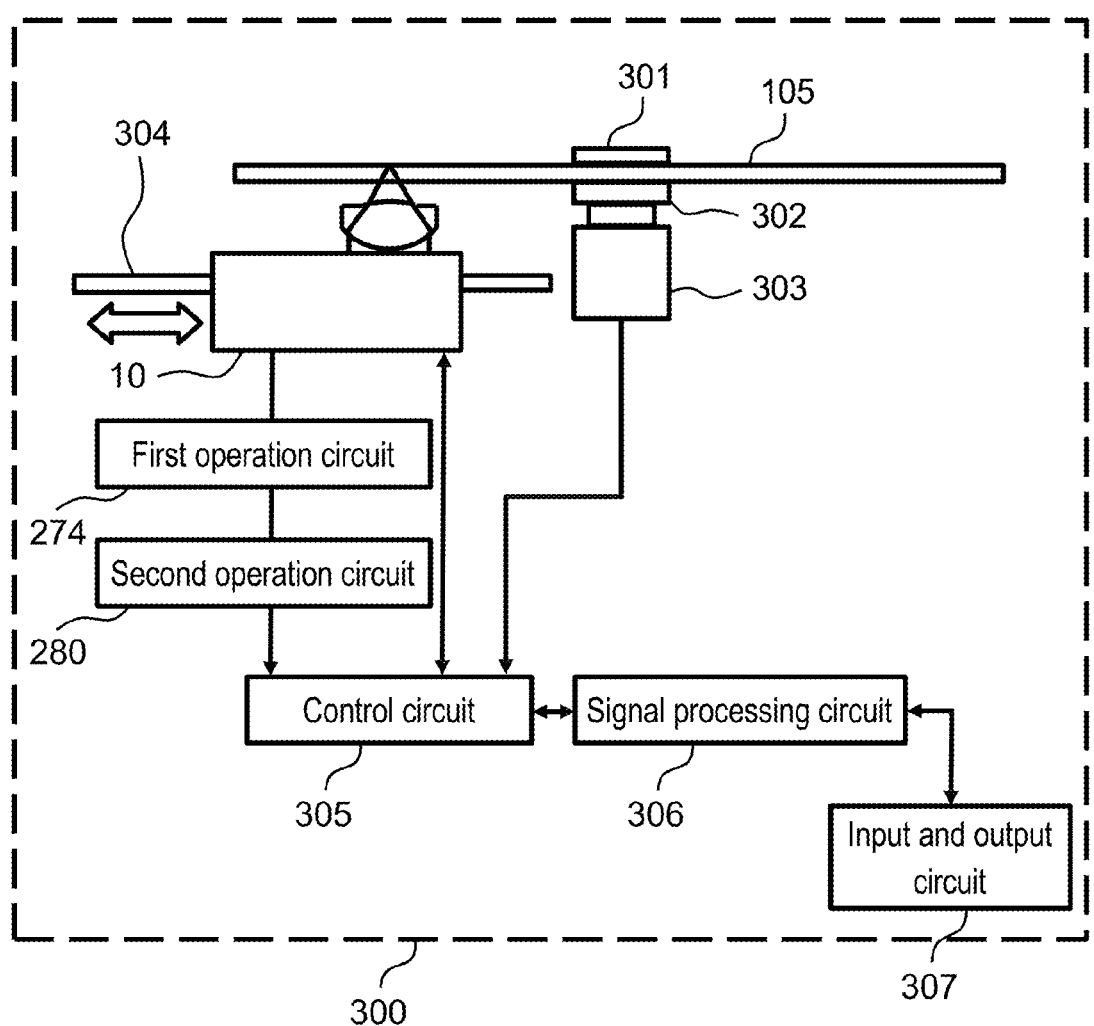
FIG. 5 is a configuration diagram of the optical disc drive in the first exemplary embodiment.

FIG. 5 is a configuration diagram of an optical disc drive in the first exemplary embodiment. As illustrated in FIG. 5, optical disc drive 300 includes damper 301, turntable 302, motor 303, transport mechanism (traverse) 304, control circuit 305, signal processing circuit 306, input and output circuit 307, optical pickup 10, first operation circuit 274, and second operation circuit 280. Optical disc 105 is fixed to turntable 302 by damper 301, and is rotated by motor 303. Optical pickup 10 is moved to a radial position to be recorded or to be reproduced, from an inner circumference to an outer circumference of optical disc 105 by transport mechanism 304. Control circuit 305 controls motor 303 and optical pickup 10 based on a signal received through first operation circuit 274 and second operation circuit 280. Signal processing circuit 306 receives a signal from optical pickup 10 through control circuit 305 to reproduce information.

In addition, signal processing circuit 306 converts the information which is desired to record into a signal to output to optical pickup 10 through control circuit 305. Signal processing circuit 306 inputs the information from an external apparatus and outputs the information to the external apparatus, through input and output circuit 307.

Incidentally, optical pickup 10 and first operation circuit 274 may be integrally configured.

[1-5. Operation]

Figure 6A:
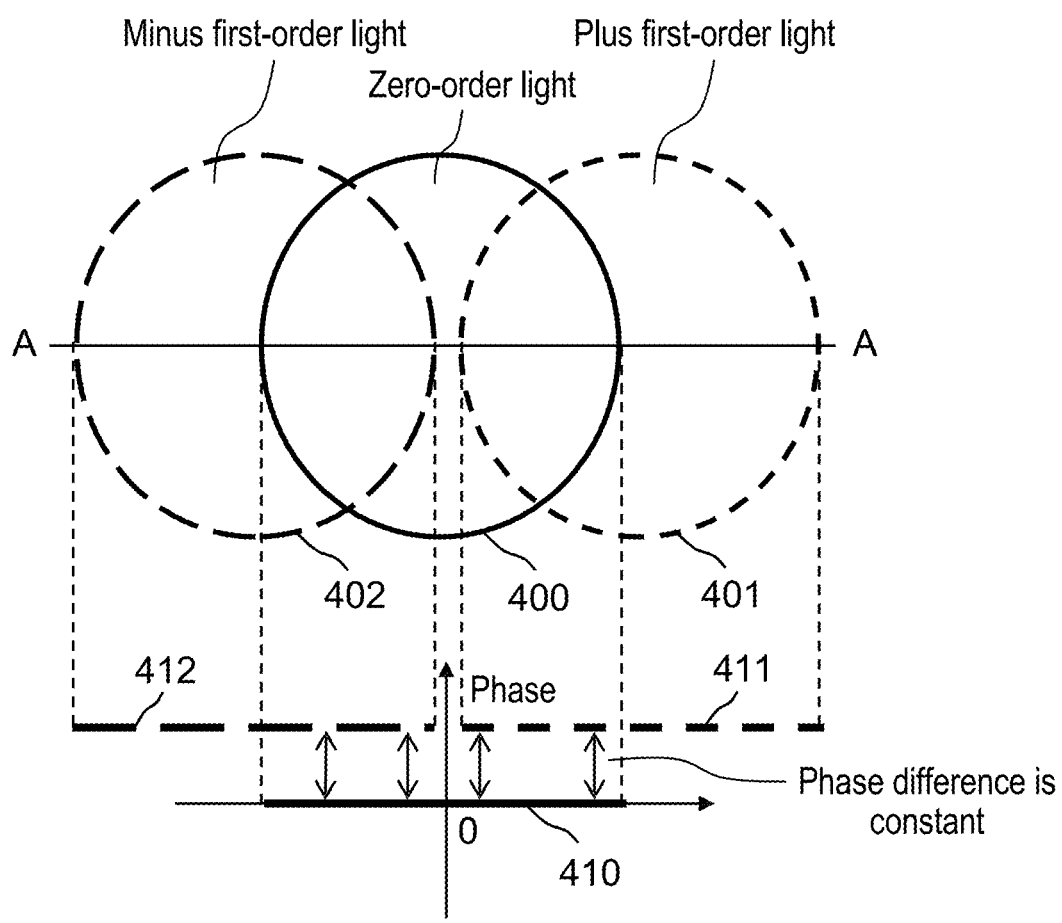
FIG. 6A is a conceptual diagram illustrating a phase relationship and a positional relationship on a far field of a zero-order light, a plus first-order diffracted light by the track and a minus first-order diffracted light by the track, in the first exemplary embodiment.

Operation of optical disc drive 300 configured as described above will be described below. FIG. 6A is a conceptual diagram illustrating a phase relationship and a positional relationship on a far field of a zero-order light, a plus first-order diffracted light by the track and a minus first-order diffracted light by the track, in the first exemplary embodiment.

In FIG. 6A, the light beam emitted to optical disc 105 and reflected and diffracted is formed by zero-order light 400, plus first-order diffracted light 401, and minus first-order diffracted light 402 that overlap with each other. Zero-order light 400 has a circular shape same as an opening and each of plus first-order diffracted light 401 and minus first-order diffracted light 402 is a light beam returned with a shift of a constant angle by diffraction by the track.

Angles formed between the center of zero-order light 400 and the center of plus first-order diffracted light 401 and between the center of zero-order light 400 and the center of minus first-order diffracted light 402 are determined by numerical aperture NA of objective lens 104, wavelength λ of the light beam, and an interval of a groove of optical disc 105.

When the light beam emitted from objective lens 104 and focused on the recording layer of optical disc 105 does not have aberration, a phase plane of the light beam is flat. A lower part of FIG. 6A illustrates a phase in A-A cross section. When the focus spot is at the center of the track, wavefront 410 of zero-order light 400, wavefront 411 of plus first-order diffracted light 401 advances (or delays) by a constant phase, and wave front 412 of minus first-order diffracted light 402 advances (or delays) by a constant phase. Wavefronts 410, 411, 412 are flat, so that a phase difference is constant at any location. For this reason, an amount of light of a region in which zero-order light 400 and plus first-order diffracted light 401 overlap and interfere with each other is a uniform intensity, and an amount of light of a region in which zero-order light 400 and minus first-order diffracted light 402 overlap and interfere with each other also is a uniform intensity.

Figure 6B:
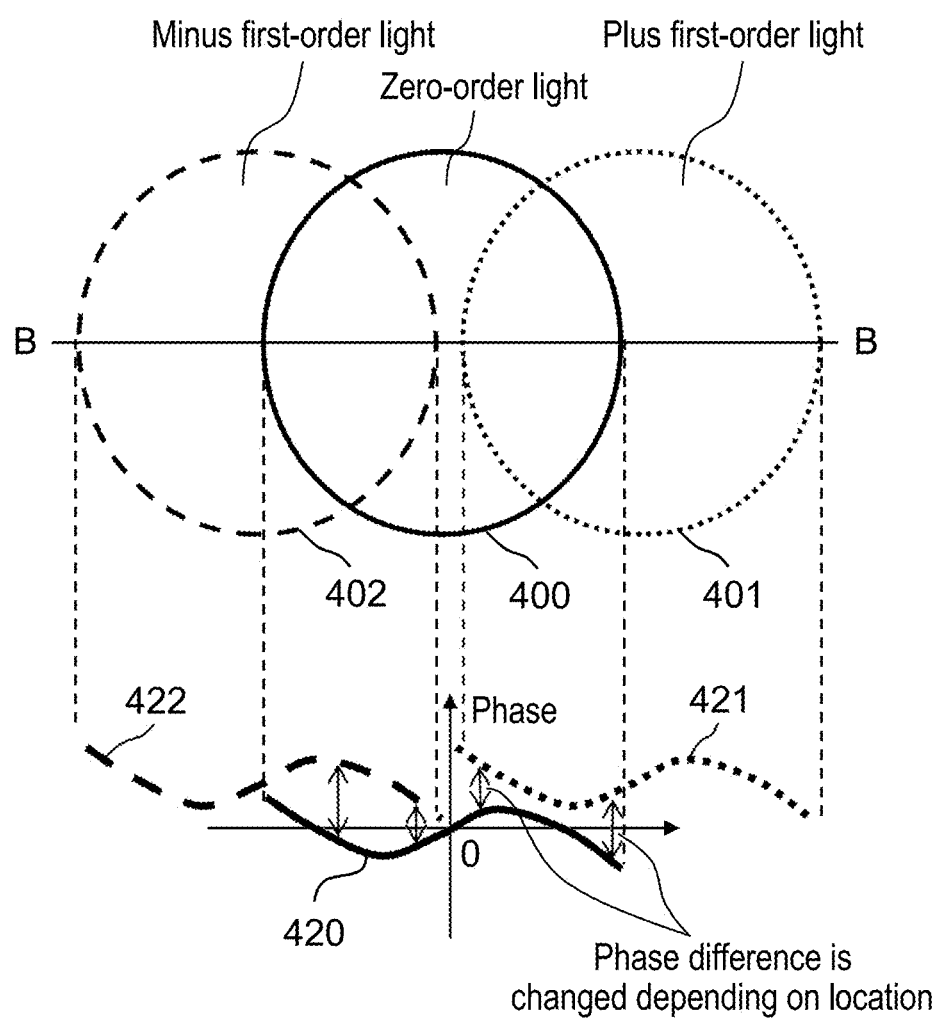
FIG. 6B is a conceptual diagram illustrating a phase relationship of wavefront of the zero-order light, the plus first-order diffracted light by the track and the minus first-order diffracted light by the track if coma aberration is present, in the first exemplary embodiment.

FIG. 6B is a conceptual diagram illustrating a phase relationship of wavefront of the zero-order light, the plus first-order diffracted light by the track and the minus first-order diffracted light by the track if coma aberration is present, in the first exemplary embodiment. When optical disc 105 tilts in the radial direction that is a vertical direction to the track tangential direction, the coma aberration is generated in the radial direction. The coma aberration distorts wavefront, and in B-B cross section, wavefront 420 of zero-order light 400 is a shape similar to a cubic function. Each of wavefront 421 of plus first-order diffracted light 401 and wavefront 422 of minus first-order diffracted light 402 is a shape similar to a cubic function. In the region in which zero-order light 400 and plus first-order diffracted light 401 overlap and interfere with each other, the phase difference varies depending on the location; in one location, the phase difference decreases, and in the other location, the phase difference increases. Also in the region in which zero-order light 400 and minus first-order diffracted light 402 overlap and interfere with each other, the phase difference varies depending on the location; in one location, the phase difference decreases, and in the other location the phase difference increases.

Figure 6C:
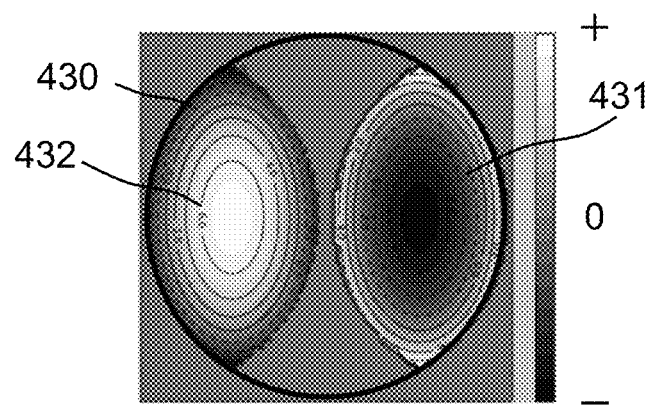
FIG. 6C is a diagram illustrating a phase difference distribution of wavefront of the zero-order light, the plus first-order diffracted light by the track and the minus first-order diffracted light by the track if the coma aberration is present, in the first exemplary embodiment.

FIG. 6C is a diagram illustrating a phase difference distribution of wavefront of the zero-order light, the plus first-order diffracted light by the track and the minus first-order diffracted light by the track if the coma aberration is present, in the first exemplary embodiment. As illustrated in FIG. 6C, if the coma aberration is present, in region 431 in which the plus first-order diffracted light and the zero-order light in light beam 430 overlap with each other, the phase difference is a negative value near the center, however, is a positive value in the periphery. In region 432 in which the minus first-order diffracted light and the zero-order light in light beam 430 overlap with each other, on the contrary, the phase difference is a positive value near the center, however, is a negative value in the periphery.

Next, influence will be described that is given to the tracking error signal by the phase difference.

Figure 7A:
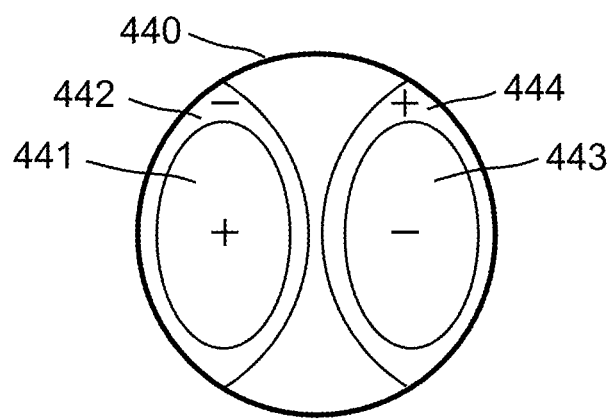
FIG. 7A is a conceptual diagram schematically representing the phase difference distribution of FIG. 6C.

FIG. 7A is a conceptual diagram schematically representing the phase difference distribution of FIG. 6C. In light beam 440, inner regions 441, 442 are the regions in which the minus first-order diffracted light and the zero-order light overlap with each other, and if coma aberration is present in any radial direction, inner region 441 has a positive phase difference, and outer region 442 has a negative phase difference. In light beam 440, inner regions 443, 444 are the regions in which the plus first-order diffracted light and the zero-order light overlap with each other, and if coma aberration is present in any radial direction, inner region 443 has a negative phase difference, and outer region 444 has a positive phase difference.

Figure 7B:
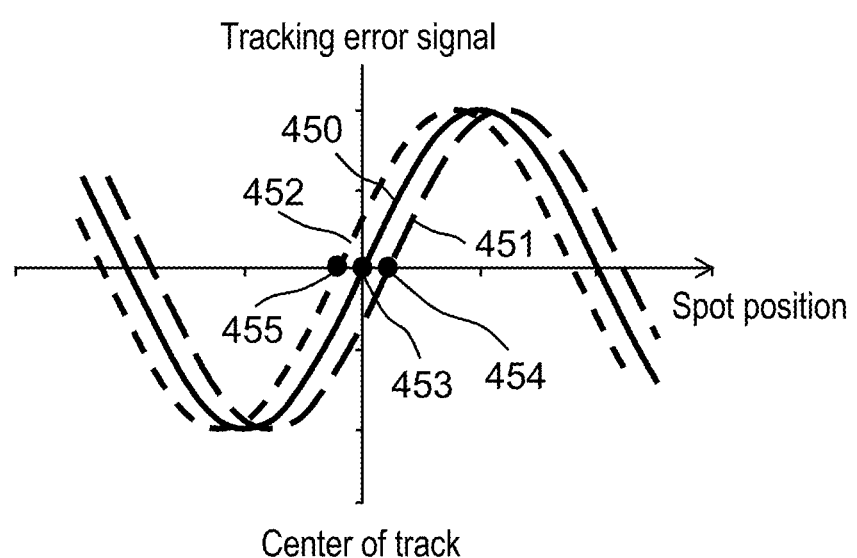
FIG. 7B is a schematic diagram illustrating a relationship between a tracking error signal and the center of the track, in the first exemplary embodiment.

FIG. 7B is a schematic diagram illustrating a relationship between the tracking error signal and the center of the track, in the first exemplary embodiment. In FIG. 7B, the horizontal axis indicates the position of the focus spot to the track, and the vertical axis indicates the tracking error signal.

In the tracking error signal by push-pull method, a phase difference of the plus first-order diffracted light and the zero-order light and a phase difference of the minus first-order diffracted light and the zero-order light are changed depending on the positional relationship between the focus spot and the track, and a sine wave-like tracking error signal is obtained. If coma aberration is not present, and when the focus spot is at the center of the track, phases of the plus first-order diffracted light and the minus first-order diffracted light are the same, so that the tracking error signal is zero. In FIG. 7B, a position of the horizontal axis indicates a point in which the tracking error signal is zero, and in tracking control, a focus spot position is controlled so that a value of the tracking error signal is zero.

If coma aberration is not present, tracking error signal 450 generated from a difference signal of an interference region, is a signal as illustrated by a solid line, and the center of the track is zero cross point 453. In such a case, the focus spot is located at the center of the track. If a case in which the phase is shifted in a negative direction, the difference signal of the interference region is zero at a point in which the focus spot position is shifted from the center of the track. For this reason, tracking error signal 451 is a signal as illustrated by a dashed line, and the focus spot is controlled to be at a position of zero cross point 454 by the tracking control. On the contrary, if the phase is shifted in a positive direction, tracking error signal 452 is a signal as illustrated by a dotted line, and the focus spot is controlled to be at a position of zero cross point 455, and a phenomenon occurs in which the focus spot is shifted from the center of the track.

For example, a case is considered in which, in the phase difference distribution of FIG. 7A, when a positive phase difference component of inner region 441 and a negative phase difference component of outer region 442 are each integrated and added together, the positive phase difference component is greater, and when a negative phase difference component of inner region 443 and a positive phase difference component of outer region 444 are each integrated and added together, the negative phase difference component is greater. In this case, the phase of the tracking error signal is shifted in the negative direction, and tracking error signal 451 as illustrated by a dashed line is obtained, so that the focus spot is controlled to be shifted to a position illustrated by zero cross point 454 from the center of the track.

Figure 7C:
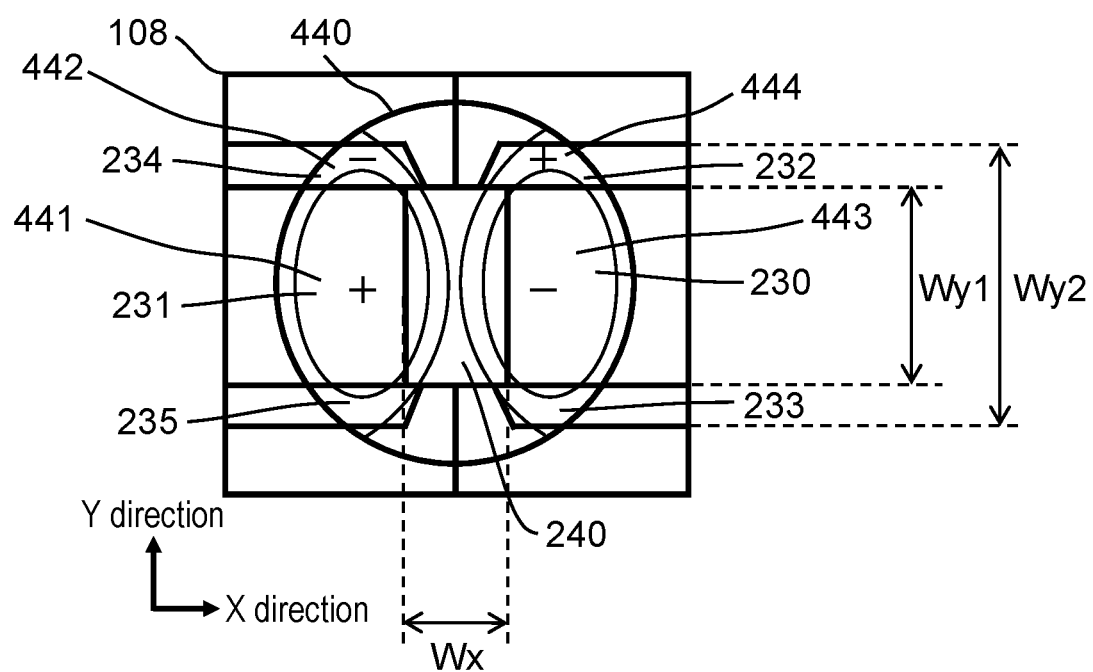
FIG. 7C is a diagram illustrating the divided regions of the diffraction element overlapped with a relationship of the phase difference distribution of a light beam, in the first exemplary embodiment.

FIG. 7C is a diagram illustrating the divided regions of the diffraction element overlapped with a relationship of the phase difference distribution of a light beam, in the first exemplary embodiment.

The ratio of inner region 443 to region 230 that is the first main region is equal to or greater than 50%. Therefore, region 230 that is the first main region, corresponding to inner region 443, mainly includes a component of change in the amount of light of the location. The ratio of inner region 441 to region 231 that is the second main region is equal to or greater than 50%. Therefore, region 231 that is the second main region, corresponding to inner region 441, mainly includes a component of change in the amount of light of the location.

The ratio of outer region 444 to each of region 232 and region 233 that are the first main end regions is equal to or greater than 50%, desirably is substantially 100%. Therefore, region 232 and region 233 that are the first main end regions, corresponding to outer region 444, each mainly include a component of change in the amount of light of the location. The ratio of outer region 442 to each of region 234 and region 235 that are the second main end regions is equal to or greater than 50%, desirably is substantially 100%. Therefore, region 234 and region 235 that are the second main end regions, corresponding to outer region 442, each mainly include a component of change in the amount of light of the location.

The ratio of a region other than inner regions 441, 443 and outer regions 442, 444 to each of the first sub-region and the second sub-region is equal to or greater than 50%, desirably is substantially 100%. Therefore, the first sub-region and the second sub-region each mainly include the region other than inner regions 441, 443 and outer regions 442, 444.

Light of region 240 that is a dummy region is not used for calculating the tracking error signal. This is to avoid influence that other layer stray light that is light reflected by a recording layer other than a target layer enters a detection region when reproduction of a recording medium having a plurality of recording layers is performed. Region 240 includes more a part of outer regions 442, 444.

Incidentally, light of the dummy region may be used for calculating the tracking error signal.

If only region 230 and region 231 are used for calculating the tracking error signal, the phase of the tracking error signal is shifted in the negative direction in the phase difference distribution, and off-track is generated.

Even if, in calculating the tracking error signal, signals of regions 232, 233 multiplied by a ratio of one are added to a signal of region 230, and signals of regions 234, 235 multiplied by the ratio of one are added to a signal of region 231, components of outer regions 442, 444 that are included in region 240 are decreased, so that the phase of the tracking error signal remains shifted in the negative direction.

On the other hand, when, in the operation of the tracking error signal, the signals of regions 232, 233 multiplied by a ratio of α greater than 1 are added to the signal of region 230, and the signals of regions 234, 235 multiplied by the ratio of a greater than 1 are added to the signal of region 231, balance of the phase difference of the region used for calculating the tracking error signal is corrected, and an integral value of the phase difference approaches zero.

Thus, it is possible to bring a phase shift of the tracking error signal close to zero, and it is possible to suppress an amount of off-track of the focus spot position.

For example, when numerical aperture NA=0.85, wavelength=405 nm, groove pitch=476 nm, groove depth=30 mλ, thickness of a cover layer of optical disc t=0.1 mm, the amount of off-track of the tracking error signal in a radial tilt of 0.3 degrees is 8 nm.

On the other hand, if width Wy1 in the Y direction of region 231 and region 232 is 60% of a diameter of light beam 440, and width Wx in the X direction of region 240 is 40%, the amount of off-track of the tracking error signal generated from the signals of region 230 and region 231 in the radial tilt of 0.3 degrees is approximately doubled to 15 nm.

Yet, on the other hand, when width Wy2 in the Y direction of the outside division line of regions 232, 233, 234, 235, 236 is 68% of the diameter of light beam 440, and a magnification α is 7, the amount of off-track of the difference signal between signal M1 and signal M2 of first operation circuit 274 is decreased to 4 nm that is about a half in a case of push-pull method. If the magnification α is 5, the amount of off-track of the difference signal between signal M1 and signal M2 of first operation circuit 274 is decreased to 6 nm that is slightly smaller than the amount in the case of push-pull method. If the magnification α is 3, the amount of off-track of the difference signal between signal M1 and signal M2 of first operation circuit 274 is 9 nm that is greater than the amount in the case of push-pull method; however, it is possible to reduce by about 40% in comparison with a case of the tracking error signal generated from a signal of the first main region and a signal of the second main region.

[1-6. Configuration of Another Diffraction Element]

Figure 8:
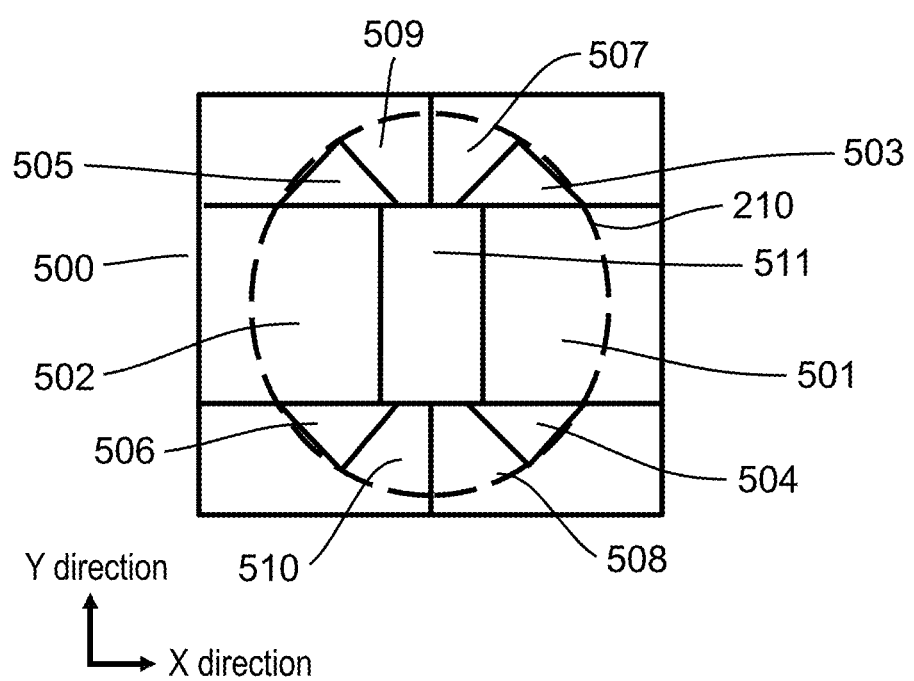
FIG. 8 is a front view of another diffraction element in the first exemplary embodiment.

FIG. 8 is a front view of another diffraction element in the first exemplary embodiment. In FIG. 8, diffraction element 500 has a different divided region from that of diffraction element 108.

Diffraction element 500 has region 501 as the first main region, and has region 502 as the second main region. In addition, diffraction element 500 has region 503 and region 504 as the first main end regions, and has region 505 and region 506 as the second main end regions. Further, diffraction element 500 has region 507 and region 508 as the first sub-regions, and has region 509 and region 510 as the second sub-regions. Dummy region is region 511.

Main differences between diffraction element 108 and diffraction element 500 are shapes of the first main end region and the second main end region. Each of regions 503, 504, 505, 506 of diffraction element 500 is a triangle, and has a closer shape to a shape of an end part in the Y direction of outer regions 442, 444 of the region in which the plus first-order diffracted light, the minus first-order diffracted light and the zero-order light overlap and interfere with each other. With this shape, it is possible to decrease a possibility of entering of noise such as stray light into the main end region that is used by being multiplied by a coefficient α greater than 1. For this reason, it is possible to obtain a more stable tracking error signal.

In diffraction element 500, if a position of the light beam is shifted from the divided region when objective lens 104 is moved due to eccentricity of the track and the like, its effect is reduced, so that it can be combined with a configuration in which diffraction element 500 is moved with a movement of objective lens 104. For example, a configuration is considered in which diffraction element 500 is disposed on actuator 107 same as objective lens 104.

[1-7. Configuration of Still Another Diffraction Element]

Figure 9:
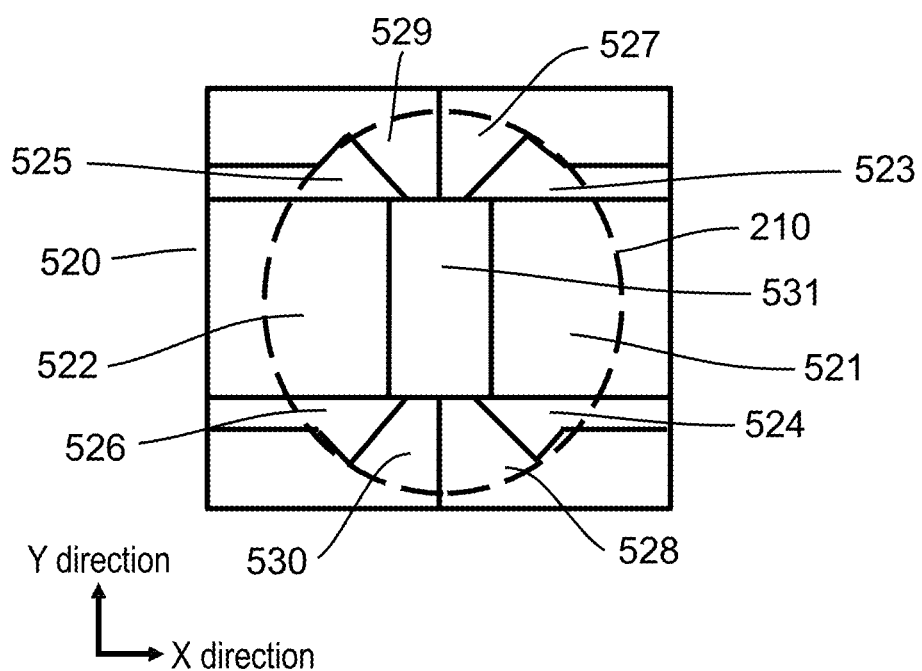
FIG. 9 is a front view of still another diffraction element in the first exemplary embodiment.

FIG. 9 is a front view of still another diffraction element in the first exemplary embodiment. In FIG. 9, diffraction element 520 has a different divided region from that of diffraction elements 108, 500.

Diffraction element 520 has region 521 as the first main region, and has region 522 as the second main region. In addition, diffraction element 520 has region 523 and region 524 as the first main end regions, and has region 525 and region 526 as the second main end regions. Further, diffraction element 520 has region 527 and region 528 as the first sub-regions, and has region 529 and region 530 as the second sub-regions. A dummy region is region 531.

Main differences between diffraction element 520 and diffraction element 108 or between diffraction element 520 and diffraction element 300 are shapes of the first main end region and the second main end region. Each of regions 523, 523, 524, 525, 526 of diffraction element 520 is a shape in which a triangle and a band shape are combined together, and is a shape in which it is considered of a closer shape to a shape of an end part of the region in which the plus first-order diffracted light, the minus first-order diffracted light and the zero-order light overlap and interfere with each other, and of a shift of the divided region due to the movement of the objective lens. In diffraction element 520, even if the position of the light beam is shifted from the divided region when objective lens 104 is moved due to eccentricity of the track and the like, its effect is not much reduced, so that it is possible to use at the same position as diffraction element 108 of FIG. 1.

[1-8. Effect]

As described above, in the present exemplary embodiment, the recording apparatus includes: semiconductor laser 101 that is a light source configured to emit a light beam; objective lens 104 configured to focus the light beam on optical disc 105 that is a recording medium having a groove-shaped track capable of recording information; beam splitter 102 configured to split the light beam reflected and diffracted by optical disc 105 from a light path of semiconductor laser 101; diffraction element 108 that is an optical element configured to divide the light beam split by beam splitter 102 into desired regions; detector 120 configured to receive a light of each region of the desired regions divided by diffraction element 108; and first operation circuit 274 configured to calculate a signal received from detector 120 and output the signal. Diffraction element 108 divides the light beam split by beam splitter 102, into a first main region mainly including a region in which a zero-order light and a plus first-order diffracted light of the track overlap with each other, a second main region mainly including a region in which the zero-order light and a minus first-order diffracted light of the track overlap with each other, a first main end region mainly including both ends in the track tangential direction of the region in which the zero-order light and the plus first-order diffracted light of the track overlap with each other, a second main end region mainly including both ends in the track tangential direction of the region in which the zero-order light and the minus first-order diffracted light of the track overlap with each other, a first sub-region located at both ends outside of the first main end region in the track tangential direction, and a second sub-region located at both ends outside of the second main end region in the track tangential direction. First operation circuit 274 generates a first main signal in which a signal from the first main end region is multiplied by the coefficient α that is greater than 1 and added to a signal from the first main region, and a second main signal in which a signal from the second main end region is multiplied by the coefficient α and added to a signal from the second main region.

Thus, the balance is corrected of the phase difference distribution generated by the coma aberration in the radial direction, so that the phase shift of the tracking error signal is decreased. For that reason, even if a radial tilt is present, it is easy to obtain the tracking error signal in which the amount of off-track is small.

In addition, in the present exemplary embodiment, instead of diffraction element 108, diffraction element 500 is used, and disposed on actuator 107.

Thus, a possibility of entering of the noise such as the stray light into the main end region that is used by being multiplied by the coefficient α greater than 1 to be emphasized is decreased, and it is easy to obtain a more stable tracking error signal. For that reason, even if a radial tilt is present, it is easy to obtain the tracking error signal in which the amount of off-track is small. In addition, in the present exemplary embodiment, instead of diffraction element 108, diffraction element 520 is used.

Thus, while reducing the possibility of entering of the noise such as the stray light into the main end region that is used by being multiplied by the coefficient α greater than 1 to be emphasized, even when the position of the light beam and the divided region are shifted to each other on diffraction element 520 depending on the movement of the objective lens, it is possible to decrease an influence of the shift, so that it is easy to obtain a stable tracking error signal. For that reason, even if a radial tilt is present, it is easy to obtain the tracking error signal in which the amount of off-track is small.

SECOND EXEMPLARY EMBODIMENT

A second exemplary embodiment will be described below with reference to FIGS. 10A to 11. A difference from the first exemplary embodiment is a configuration of a diffraction element, and, other than the diffraction element, a configuration of an optical pickup and a configuration of an optical disc drive are basically the same as those of the first exemplary embodiment.

[2-1. Configuration of Diffraction Element]

Figure 10A:
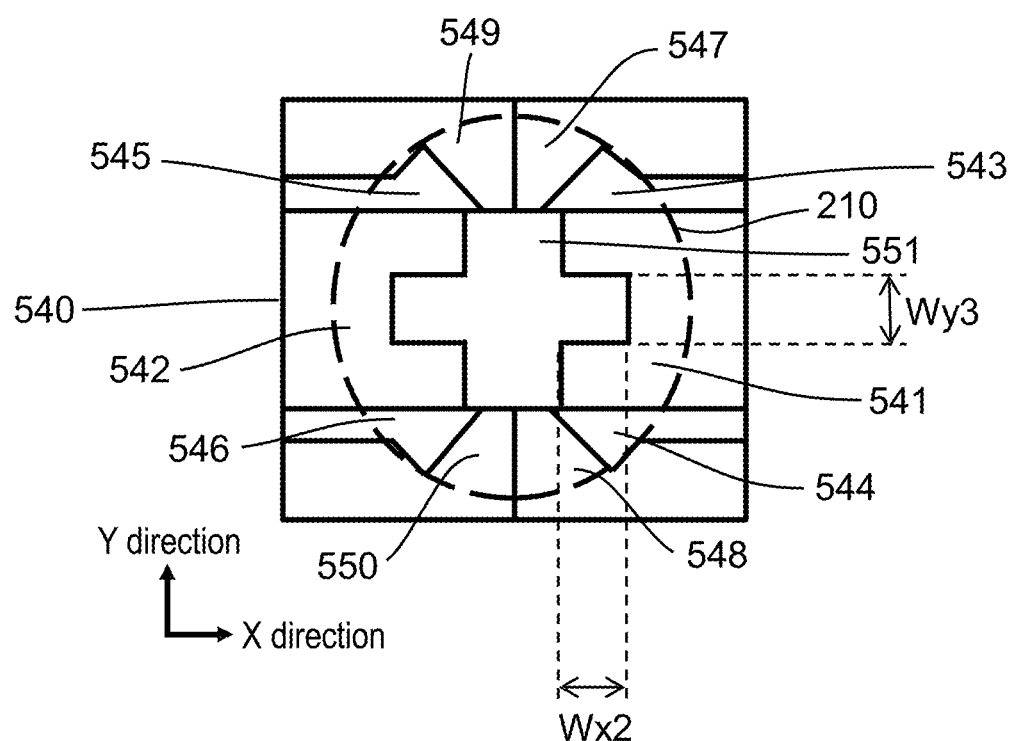
FIG. 10A is a front view of a diffraction element in a second exemplary embodiment.

FIG. 10A is a front view of a diffraction element in the second exemplary embodiment.

Diffraction element 540 has region 541 as the first main region, and has region 542 as the second main region.

In addition, diffraction element 540 has region 543 and region 544 as the first main end regions, and has region 545 and region 546 as the second main end regions.

Further, diffraction element 540 has region 547 and region 548 as the first sub-regions, and has region 549 and region 550 as the second sub-regions.

A dummy region is region 551.

Main differences between diffraction element 108 of the first exemplary embodiment and diffraction element 540 of the present exemplary embodiment are shapes of a first main region and a second main region. Each of shapes of a first main end region and a second main end region is the same as that of diffraction element 520 described in the first exemplary embodiment.

Figure 10B:
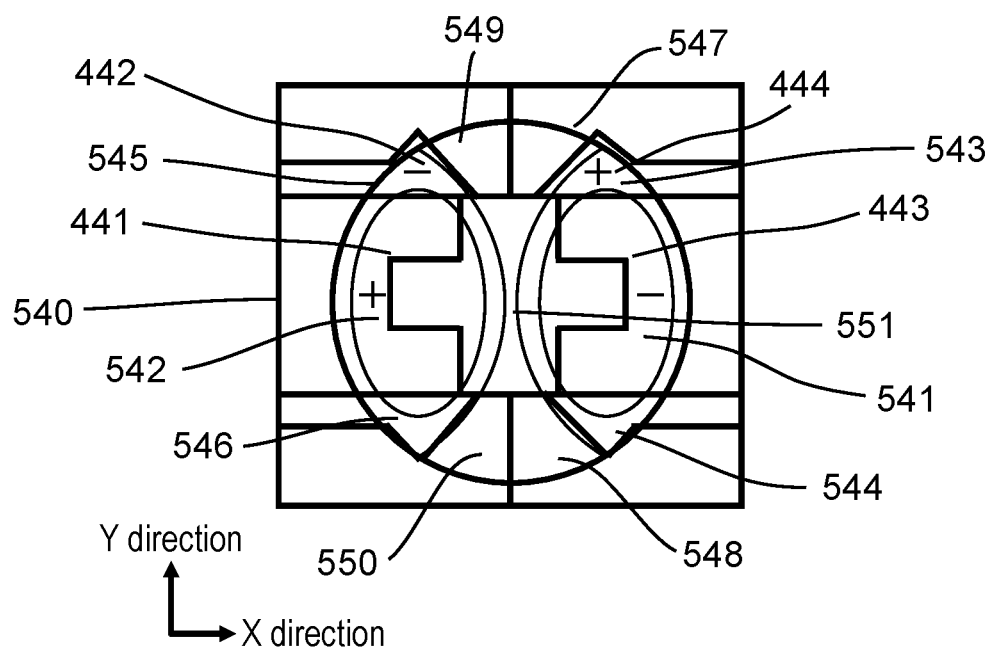
FIG. 10B is a diagram illustrating the divided regions of the diffraction element overlapped with a phase difference distribution of a light beam if coma aberration is present, in the second exemplary embodiment.

FIG. 10B is a diagram illustrating the divided regions of the diffraction element overlapped with a phase difference distribution of a light beam if coma aberration is present, in the second exemplary embodiment. As described in FIG. 10A, both of near central parts of region 541 that is the first main region and region 542 that is the second main region have concave shapes. With this shape, it is possible to decrease an area of inner region 443 in which a phase difference is negative and that is included in region 541 that is the first main region, and it is possible to decrease an area of inner region 441 in which the phase difference is positive and that is included in region 542 that is the second main region. Thus, balance of the phase difference, when the tracking error signal is calculated, is easily achieved, and it is possible to suppress a value of a coefficient α to be smaller. The coefficient α is greater than 1, and regions 543, 544 that are the first main end regions and regions 545, 546 that are the second main end regions are multiplied by the coefficient α.

If the ratio of width Wy3 in the Y direction of the concave shape to a light beam diameter is 30%, and the ratio of width Wx2 in the X direction to a light beam diameter is 5%, it is possible to decrease the value of α by about 20% to obtain the same effect as the first exemplary embodiment.

[2-2. Configuration of Another Diffraction Element]

Figure 11:
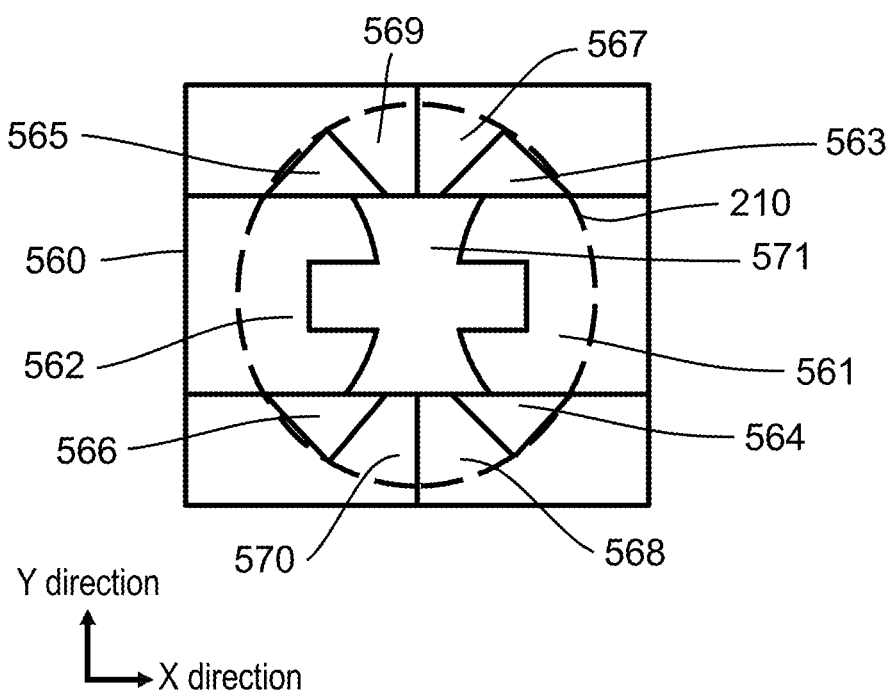
FIG. 11 is a front view of another diffraction element in the second exemplary embodiment.

FIG. 11 is a front view of another diffraction element in the second exemplary embodiment.

Diffraction element 560 has region 561 as the first main region, and has region 562 as the second main region. In addition, diffraction element 560 has region 563 and region 564 as the first main end regions, and has region 565 and region 566 as the second main end regions.

Further, diffraction element 560 has region 567 and region 568 as the first sub-regions, and has region 569 and region 570 as the second sub-regions.

A dummy region is region 571.

Main differences between diffraction element 560 and diffraction element 540 described in FIG. 10A are shapes of regions 563, 564 that are the first main end regions and regions 565, 566 that are the second main end regions, and shapes of region 561 that is the first main region and region 562 that is the second main region. Each of regions 563, 564, 565, 566 of diffraction element 560 is a triangle, and has a closer shape to a shape of an end part of the region in which the plus first-order diffracted light, the minus first-order diffracted light and the zero-order light overlap and interfere with each other.

This shape is possible to decrease a possibility of entering noise such as stray light into a main end region that is used by being multiplied by the coefficient α greater than 1, so that it is possible to obtain a more stable tracking error signal. In diffraction element 560, if a position of the light beam is shifted from the divided region when objective lens 104 is moved due to eccentricity of the track and the like, its effect is reduced, so that it can be combined with a case of a configuration in which diffraction element 560 is moved with a movement of objective lens 104. For example, a configuration is considered in which diffraction element 560 is disposed on actuator 107 same as objective lens 104. A boundary between region 571 and regions 561, 562 that are the main regions has an arc-like shape. This is because the shape is made to fit a shape of an interference region in which the plus first-order diffracted light of the track, the minus first-order diffracted light of the track and the zero-order light overlap with each other.

With this shape, the ratio of the interference region of the light beam that enters the main region is increased. For this reason, it is possible to decrease the ratio of a DC component to an AC component when the tracking error signal is operated, and it is unlikely to generate an offset. Therefore, it is possible to generate a more stable tracking signal.

[2-3. Effect]

As described above, in the present exemplary embodiment, the recording apparatus includes: semiconductor laser 101 that is a light source configured to emit a light beam; objective lens 104 configured to focus the light beam on optical disc 105 that is a recording medium having a groove-shaped track capable of recording information; beam splitter 102 configured to split the light beam reflected and diffracted by optical disc 105 from a light path of semiconductor laser 101; diffraction element 540 (560) that is an optical element configured to divide the light beam split by beam splitter 102 into desired regions; detector 120 configured to receive a light of each region of the desired regions divided by diffraction element 540 (560); and first operation circuit 274 configured to calculate a signal received from detector 120 and output the signal. The diffraction element 540 (560) divides the light beam split by beam splitter 102, into a first main region mainly including a region in which a zero-order light and a plus first-order diffracted light of the track overlap with each other, a second main region mainly including a region in which the zero-order light and a minus first-order diffracted light of the track overlap with each other, a first main end region mainly including both ends in a track tangential direction of the region in which the zero-order light and the plus first-order diffracted light of the track overlap with each other, a second main end region mainly including both ends in the track tangential direction of the region in which the zero-order light and the minus first-order diffracted light of the track overlap with each other, a first sub-region located at both ends outside of the first main end region in the track tangential direction, and a second sub-region located at both ends outside of the second main end region in the track tangential direction. First operation circuit 274 generates a first main signal in which a signal from the first main end region is multiplied by the coefficient α that is greater than 1 and added to a signal from the first main region, and a second main signal in which a signal from the second main end region is multiplied by the coefficient α and added to a signal from the second main region. Further, the first main region and the second main region divided from diffraction element 540 (560) exclude near the central portion of the region in which the zero-order light and the plus first-order diffracted light of the track overlap with each other, and near the center portion of the region in which the zero-order light and the minus first-order diffracted light of the track overlap with each other.

Thus, even if it is a smaller coefficient α, the balance of the phase difference distribution generated by the coma aberration in the radial direction is corrected, and the phase shift of the tracking error signal is decreased. For that reason, even if a radial tilt is present, it is easy to obtain a tracking error signal in which the amount of off-track is small.

OTHER EXEMPLARY EMBODIMENT

As described above, as an illustration of a technique disclosed in the present application, the first and second exemplary embodiments have been described. However, the technique of the present disclosure is not limited thereto, and it is also possible to apply to an exemplary embodiment in which modification, replacement, addition, omission are appropriately performed. In addition, it is possible to make a new exemplary embodiment by combining elements described in the above first and second exemplary embodiments.

Therefore, the other exemplary embodiment will be exemplified below.

In the first and second exemplary embodiments, the diffraction element has been described as one example of the optical element configured to divide the light beam into the desired regions. The optical element may have a function for dividing the light beam into particular regions to guide to different positions. Therefore, the optical element is not limited to the diffraction element.

However, when the diffraction element is used as the optical element, it is possible to have a function for focusing simultaneously with for dividing, so that it is possible to make a photo detecting region of a detector small. In addition, the diffraction element has a high degree of freedom in a shape of the divided region, and it is possible to decrease manufacturing variations. As the optical element configured to divide the light beam into the desired regions, a splitting prism may be used. If the splitting prism is used as the optical element, it is possible to increase use efficiency of the light beam, and to increase a Signal-to-Noise (SN) ratio of the signal to be obtained.

In addition, although an example has been described of using an optical disc as a recording medium, a tape-like medium may be used as the recording medium. It is considered of a case of performing recording and reproducing and tracking by light using the tape-like medium, and a case of performing the recording and reproducing by a magnetic method and using the light only for the tracking. In both cases, if an optical pickup having a configuration illustrated in the above exemplary embodiment is used when tracking control is performed, the amount of off-track can be suppressed even if the coma aberration is present.

In addition, in the first and second exemplary embodiments, although an example of driving an objective lens as an example of an actuator has been described, a position of a focus spot may be moved by moving an arm shape supporting column that supports an entire optical pickup.

In addition, although gains of amplifiers 270, 272 are fixed in the first and second exemplary embodiments, the amplifiers may be variable gain amplification circuits. In that case, it is possible to reduce the amount of off-track by changing a coefficient α when a groove depth, a groove pitch, and the like are changed of the optical disc that is the recording medium.

In addition, configurations have been described in which first operation circuit 274 and second operation circuit 280 are configured by combining individual operation circuits such as an amplifier and an adder in the first and second exemplary embodiments, these may be configurations in which signals are converted to digital signals by Analog-to-Digital (A/D) conversion and then taken into an Large Scale Integration (LSI) having an operation function, and operations are performed such as addition, multiplication, subtraction by software, and Digital-to-Analog (D/A) conversion is performed to the signals of operation results to drive the actuator. In that case, it is possible to decrease a number of elements, and to perform more precise control such as circuit offset correction.

Incidentally, since the above described exemplary embodiments are intended to illustrate the technique of the present disclosure, various modifications, substitutions, additions, omissions and the like can be performed within the scope of the claims or the scope of the equivalents of the claims.

What is claimed is:

1. A recording apparatus comprising:
 a light source configured to emit a light beam;
 an objective lens configured to focus the light beam on a recording medium having a groove-shaped track capable of recording information;
 a beam splitter configured to split the light beam reflected and diffracted by the recording medium from a light path of the light source;
 an optical element configured to divide the light beam split by the beam splitter into desired regions;
 a detector configured to receive a light of each region of the desired regions divided by the optical element; and
 a first operation circuit configured to calculate a signal received from the detector and output the signal,
 wherein the optical element divides the light beam split by the beam splitter, into
 a first main region mainly including a region in which a zero-order light and a plus first-order diffracted light of the track overlap with each other,
 a second main region mainly including a region in which the zero-order light and a minus first-order diffracted light of the track overlap with each other,
 a first main end region mainly including both ends in a track tangential direction of the region in which the zero-order light and the plus first-order diffracted light of the track overlap with each other,
 a second main end region mainly including both ends in the track tangential direction of the region in which the zero-order light and the minus first-order diffracted light of the track overlap with each other,
 a first sub-region located at both ends outside of the first main end region in the track tangential direction, and a second sub-region located at both ends outside of the second main end region in the track tangential direction, and the first operation circuit generates a first main signal in which a signal from the first main end region is multiplied by a coefficient α that is greater than 1 and added to a signal from the first main region, and a second main signal in which a signal from the second main end region is multiplied by the coefficient α and added to a signal from the second main region.

2. The recording apparatus according to claim 1, further comprising, a second operation circuit configured to receive a signal from the first operation circuit to generate a tracking error signal, and an actuator configured to move a position of a focus spot of the light beam on the recording medium, wherein the second operation circuit generates a main difference signal of a difference signal between the first main signal and the second main signal, and generates a sub-difference signal of a difference signal between a signal from the first sub-region and a signal from the second sub-region, and, multiplies the sub-difference signal by k, where k is a variable gain, and outputs a signal obtained by subtracting the sub-difference signal multiplied by k from the main difference signal, and the actuator receives the signal output from the second operation circuit to move the focus spot of the light beam on the recording medium.

3. The recording apparatus according to claim 1, wherein the optical element further divides the light beam split by the beam splitter into a dummy region corresponding to the central portion of the light beam, and the second operation circuit calculates without a light of the dummy region.

4. The recording apparatus according to claim 1, wherein the first main region and the second main region divided from the optical element exclude near the center portion of the region in which the zero-order light and the plus first-order diffracted light of the track overlap with each other, and near the center portion of the region in which the zero-order light and the minus first-order diffracted light of the track overlap with each other.

5. The recording apparatus according to claim 1, wherein the optical element is a diffraction element configured to guide the light beam diffracted to desired different regions.

6. The recording apparatus according to claim 1, wherein the coefficient α of the first operation circuit is equal to or greater than 3.

7. The recording apparatus according to claim 1, wherein the coefficient α of the first operation circuit is equal to or greater than 5.

8. The recording apparatus according to claim 1, wherein a shape of each end of the both ends in the track tangential direction of the first main end region is a shape that overlaps the region in which the zero-order light and the plus first-order diffracted light of the track overlap with each other, and a shape of each end of the both ends in the track tangential direction of the second main end region is a shape that overlaps the region in which the zero-order light and the minus first-order diffracted light of the track overlap with each other.

* * * * *